United States Patent [19]

Campbell et al.

[11] Patent Number: 4,913,267

[45] Date of Patent: Apr. 3, 1990

[54] VEHICLE DISC BRAKES OF THE LIQUID COOLED TYPE

[75] Inventors: Roy Campbell, Worcestershire, England; Anthony G. Price; Andrew P. Green, both of Gwent, Wales

[73] Assignee: Lucas Industries Limited Company, England

[21] Appl. No.: 225,303

[22] Filed: Jul. 28, 1988

[30] Foreign Application Priority Data

Jul. 28, 1987 [GB] United Kingdom ................ 8717875
Sep. 21, 1987 [GB] United Kingdom ................ 8722295

[51] Int. Cl.[4] ............................................ F16D 65/853
[52] U.S. Cl. ........................ 188/218 XL; 188/264 E; 188/264 P; 188/71.6; 192/70.12; 192/70.14; 192/113 B
[58] Field of Search ........... 188/264 E, 264 P, 264 A, 188/264 AA, 71.6; 192/113 B, 70.12, 70.14

[56] References Cited

U.S. PATENT DOCUMENTS

| | | | |
|---|---|---|---|
| 984,253 | 2/1911 | Adriance et al. | 188/264 A |
| 2,690,248 | 9/1954 | McDowall | 192/113 B |
| 3,002,595 | 10/1961 | Weir | 188/264 A X |
| 3,397,761 | 8/1968 | Lindquist | 192/70.14 X |
| 3,403,758 | 10/1968 | Stout | 188/218 XL X |
| 3,552,534 | 1/1971 | Kern | 192/113 B |
| 4,022,298 | 5/1977 | Malinowski | 188/71.6 |
| 4,368,810 | 1/1983 | Maucher et al. | 192/70.12 X |
| 4,675,128 | 4/1987 | Fujito et al. | 192/70.12 X |

FOREIGN PATENT DOCUMENTS

| | | | |
|---|---|---|---|
| 2087998 | 6/1982 | United Kingdom | 188/71.6 |
| 2141193 | 12/1984 | United Kingdom | . |

Primary Examiner—George E. A. Halvosa
Attorney, Agent, or Firm—Oldham & Oldham Co.

[57] ABSTRACT

A rotatable member for a brake of the liquid cooled type comprises a disc provided on opposite sides with annular braking faces. The disc incorporates a plurality of angularly spaced liquid supply slots which extend through the material of the disc and radially outwards from a position inwardly of the inner peripheral edges of the braking faces. A portion at the inner end of each slot is of a circumferential length greater than the remainder of the slot. The member may comprise a braking member for the brake, or it may be separate from the brake and act as a pump member in the form of a turbo disc.

19 Claims, 6 Drawing Sheets

VEHICLE DISC BRAKES OF THE LIQUID COOLED TYPE

This invention relates to improvements in vehicle disc brakes of the liquid-cooled type, of the kind in which at least one rotatable friction braking member slidably keyed to a shaft to be braked is rotatable in a housing containing a cooling liquid for cooling the braking member, and actuating means is provided for urging the braking member into engagement with a relatively stationary braking surface to apply the brake. This invention is also concerned with the rotatable member for such a brake, suitably a rotatable friction member or a rotatable pump member.

Brakes of the kind set forth are commonly used in tractors or the like vehicles, and the cooling liquid usually comprises oil from the gearbox. In order to minimises parasitic drag, particularly when the oil is cool, and conserve consequent power, it is usual for the oil in the gearbox to be maintained substantially at the minimum level only necessary to provided adequate lubrication. This, in turn, creates the problem that such a minimum level represents a volume of oil which is normally inadequate to achieve a degree of cooling of the braking member necessary to sustain a minimum wear life for the lining.

In our GB-A-2,141,193 we have disclosed a disc brake of the kind set forth in which the braking member carries a lining of friction material, and the lining of friction material is separated into inner and outer annular rings by a single annular groove, substantially coaxially with the axis of rotation of the rotatable friction braking member, said groove acting as a reservoir for cooling liquid, throttling means are provided for throttling the flow of liquid across the braking faces of the rings, and reservoir supply flow grooves are provided in the inner ring to replenish the cooling liquid of the annular groove.

In some of the specific constructions disclosed in GB-A-2,141,193, the reservoir supply grooves comprise slots which pass through the material of the braking member and the lining and are parallel-sided and elongate radially, the slots extending radially outwards from a position inwardly of the inner edge of the inner ring.

According to our invention a rotatable member for a brake of the liquid-cooled type comprises a rotatable disc having an inner peripheral edge and an outer peripheral edge, and the disc incorporates a plurality of angularly spaced liquid supply grooves in the form of slots which extend through the material of the disc and radially outwards from a position inwardly of the inner peripheral edge, and at least a portion of the inner end of each slot is of a circumferential length greater than the remainder of the slot.

When the rotatable member comprises a rotatable friction member for a disc brake of the liquid-cooled type the disc is provided on opposite sides with annular braking surfaces, each having an inner peripheral edge and an outer peripheral edge, the slots extend radially outwards from a position inwardly of the inner peripheral edges of the braking surfaces.

Increasing the circumferential length of the inner end portion of each slot increases liquid "pick", thereby enhancing the distribution of liquid to the braking surfaces.

Each slot may be of substantially L-shaped outline, or Tee-shaped outline, with the foot of the L, or the head of the Tee constituting the inner end portion.

Preferably the braking member is also combined in an assembly with a plurality of angularly spaced baffles with extend axially from at least one face of the braking member and preferably correspond in number to the number of slots provided in the member, the baffles overlie the inner end portions of the slots but terminate short of the inner peripheral edge of the respective braking surface.

The baffles may be disposed adjacent to the trailing edges of the slots for a normal forward direction of rotation of the members in order to improve the direction of cooling liquid into the slots.

When the slots are of L-shaped outline, the inner end portions extend circumferentially relatively away from baffles.

Consequently the baffles are arranged within a reservoir for cooling liquid which is defined between the braking member and an annular wall and to which liquid is supplied from a sump by suitable means, such as by gravity or a pumped supply.

When the rotatable member comprises a rotatable pump member for circulating liquid through a brake of the liquid-cooled type the disc is also provided with an arrangement of liquid-flow grooves constructed and arranged according to the amount of liquid to be carried.

For example, the disc may have wider artery grooves feeding smaller capilliary grooves, and/or smaller capilliary grooves leading into larger vein grooves which then expel oil from the disc.

Preferably the disc comprises an annular metal core provided on opposite sides with linings of friction or other similar material, the slots extend through the material of the core and through the linings, and the liquid flow grooves are provided only in the linings.

This has the advantage that the pump member may also be utilised to act as a braking member in a disc brake of the liquid-cooled type.

Conveniently, however, the pump member may be separate from and outside the braking members or stack in a brake of the liquid-cooled type.

This enables us to increase the diameter beyond that of the friction members which, in turn, allows greater peripheral speeds, large annular volume, and much lower oil feed level, for example from below the normal level of liquid in the sump of an axle.

In such a construction the pump member is driven from the shaft to be braked and on which it is slidably mounted.

In other constructions the pump member may be installed in other positions, for example at the entrance to the differential driving the axle to be braked, or between the differential and the or each axle or half shaft.

Some embodiments of our invention are illustrated in the occupying drawings in which.

Figures 1, 2:
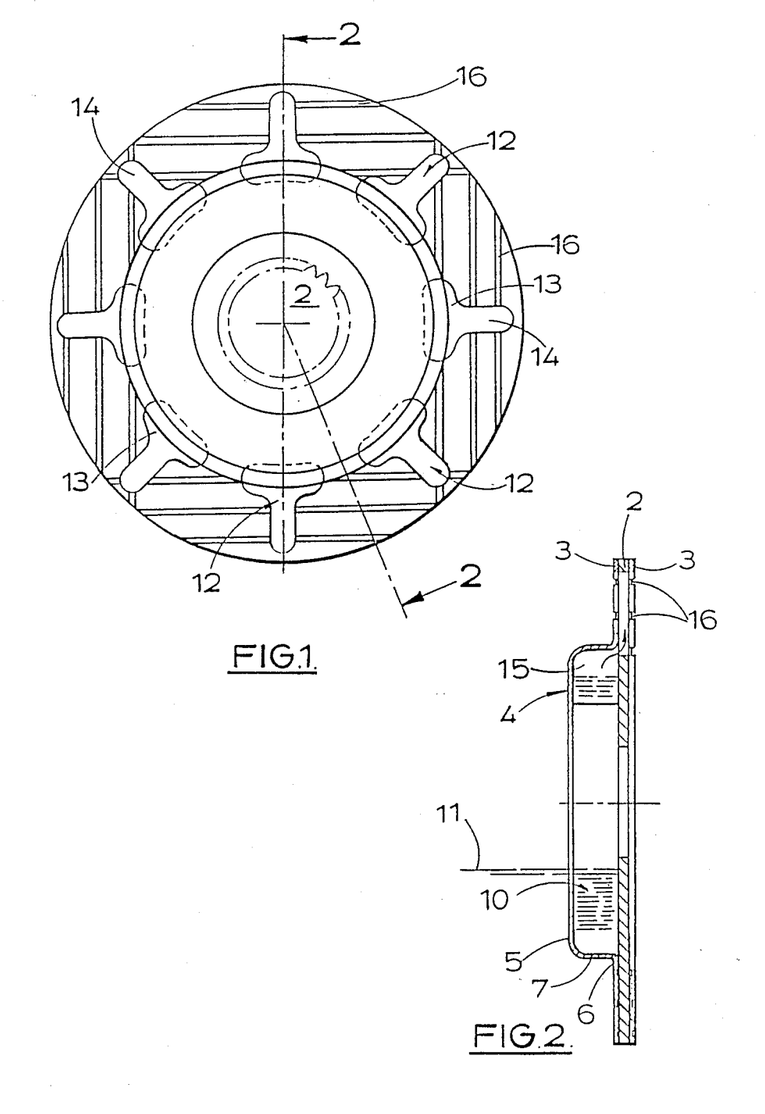
FIG. 1 is an end view of a friction braking member for a brake of the liquid-cooled multi-plate type.
FIG. 2 is a section on the line 2—2 of FIG. 1.

The friction braking member illustrated in FIGS. 1 and 2 of the accompanying drawings is suitable for use as a rotatable braking member in a multi-plate brake of the liquid-cooled type, such as that disclosed in our GB-A-2,141,193, with the braking member mounted for sliding axial movement on a rotatable shaft 1 which extend axially through the housing of the brake. The housing also defines a sump for liquid for cooling the braking surfaces of the brake, specifically the engaging faces between the rotatable friction braking members, and the relatively stationary components.

The friction braking member comprises a metal disc 2 of annular outline which is slidably splined on the shaft 1. The disc 2 is provided on opposite sides with annular linings 3 of friction material which are superimposed and of which the outer peripheral edges coincide with the outer peripheral edge of the disc.

A wall of dish-shaped outline comprises oppositely directed inner and outer annular flanges 5, 6 which are interconnected by a circumferentially extending rim 7. The inner flange 5 is of a greater radial length than the outer flange 6, and the outer flange 6 is secured to the disc with its outer peripheral edge disposed inwardly of the inner peripheral edge of the lining 3.

A reservoir 10 for liquid defined between the wall 4 and the disc 2 is adapted to be supplied with liquid at a level 11 in the sump in the housing.

The braking member is provided with a plurality of angularly spaced slots 12, each of generally Tee-shaped outline, and through which liquid is fed from the reservoir 10 and to the outer faces of the friction linings 3 which constitute braking faces.

Specifically each slot has an inner portion 13 comprising the head of the Tee which extends circumferentially in opposite direction from a central stem 14 which, in turn, extends radially towards the peripheral edge of the member. The heads 13 of all the slots 12 lie on a pitch circle. The slots 12 extend between opposite sides of the member, passing through both the material of the disc 2, and the material of the friction linings 3.

Innermost portions of the heads 13 project into the reservoir 10 to enable liquid to be fed by centrifugal force from the reservoir 10, and onto the braking faces.

To enhance the pick-up and retention of liquid within the slots 12, the reservoir 10 is divided interiorly into a plurality of angularly spaced chambers, each of generally segmental outline, by means of angularly spaced radial baffles 15 corresponding in number to the number of slots 12 provided. The baffles 15 extend from the outer edge of the reservoir 10, thereby overlapping the innermost portions of the heads 13, substantially to the inner edge of the flange 5, and each baffle 15 is located at the trailing end of each respective slot 12, for a given normal forward direction of disc rotation. The baffles 15 act to direct the cooling liquid into the respective slots 12.

As in the constructions described in GB-A-2,141,193, the outer faces of the linings 3 are provided with liquid-flow grooves 16 to facilitate the transfer of liquid across the braking faces.

Figure 3:
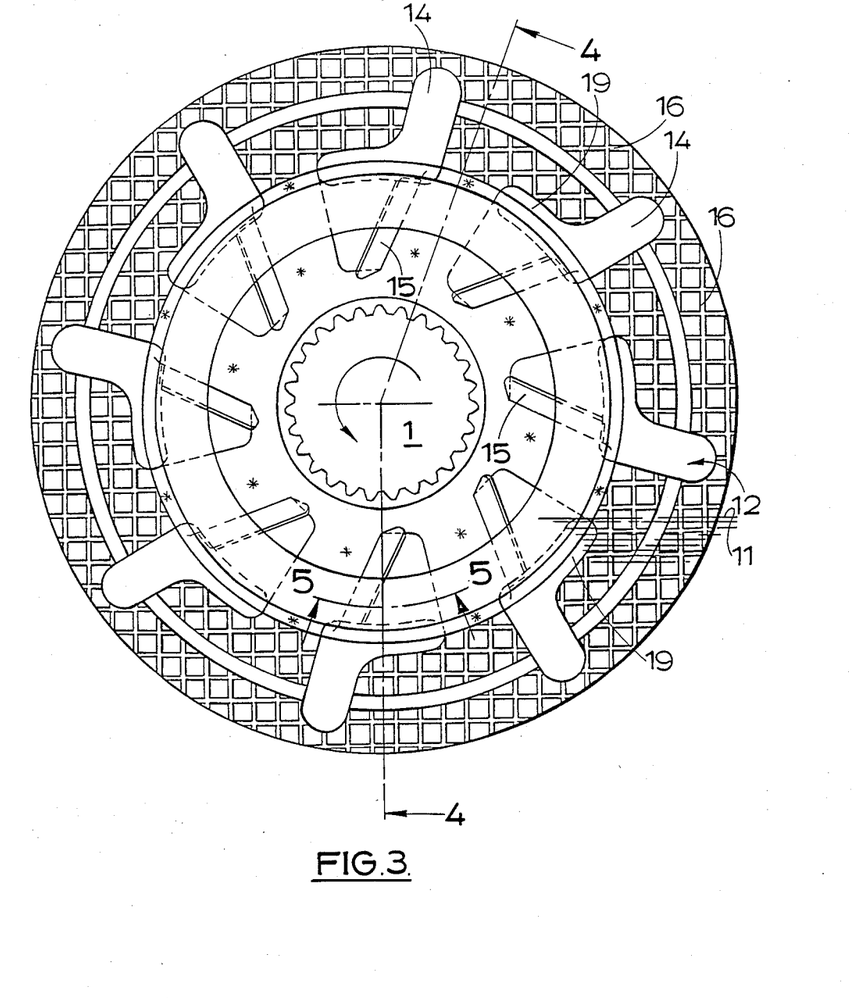
FIG. 3 is a view similar to FIG. 1 of another friction member.
Figure 4:
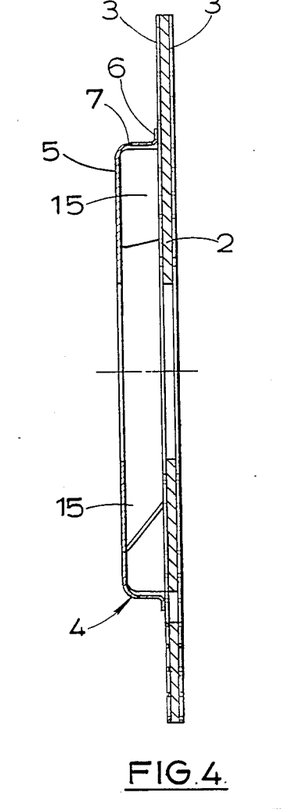
FIG. 4 is a section on the line 4—4 of FIG. 3.
Figure 5:
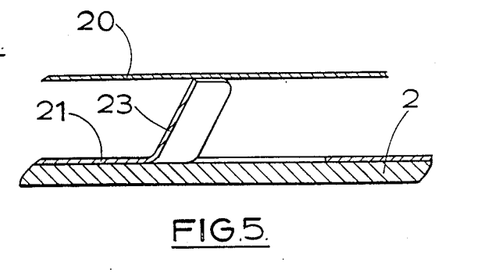
FIG. 5 is a section on the line 5—5 of FIG. 3.

In the member illustrated in FIGS. 3-5, the baffles 15 are extended radially inwardly of the inner peripheral edge of the flange 5 and are inclined with respect to the wall 4 and the disc 2 itself so that the disc acts as an impeller to help fill the reservoir 10. The slots 12 are of L-shaped outline with their feet 19 projecting circumferentially relatively away from the baffles 15 which are again located at the trailing ends of the slots 12.

The wall 4 and the baffles 15 are constructed from metal pressings 20, 21.

The pressing 21 is generally flat with flaps 23 bent up from it, and the pressing 20, which comprises the wall 4, is of generally dish-shaped outline with the free ends of the flaps 23 engaging the inner face of the wall 4. The pressings 20 and 21 are attached to the disc by any suitable means, for example by welding, the use of tags, or by bonding.

The braking member of FIGS. 3-5 is otherwise the same as that of FIGS. 1 and 2, and corresponding reference numerals have been applied to corresponding parts.

Figure 6:
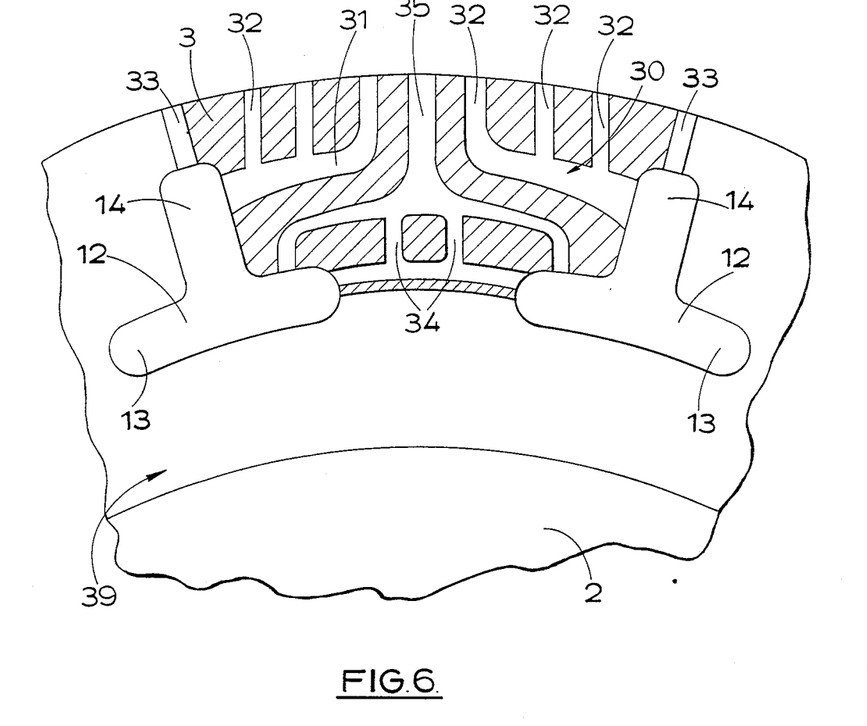
FIG. 6 is a view similar to FIG. 1 illustrating a portion of a rotatable disc for a brake of the liquid-cooled multi-plate type.

The rotatable member 39 illustrated in FIG. 6 of the drawings is similar to that of FIG. 1 and may be used as a braking member in a multi-plate disc brake of the liquid-cooled type as described above.

In this construction the slots 12 again extend through the material of the metal disc 2 and both annular linings 3 are formed with patterns of liquid-flow grooves 30 to facilitate the transfer of liquid across the outer faces of the linings. As illustrated, each pattern of flow grooves comprise an artery groove 31 which leads from the outer end of a stem 14 of a slot 12, and feeds smaller capilliary grooves 32 which are generally radial and terminate at the edge of the respective lining 3. In addition, a single capillary groove 33 extends radially outwards from the outer end of the stem 14 itself. The heads 13 of adjacent slots 12 are also interconnected by capilliary grooves 34 which, in turn, lead into larger vein grooves 35, again terminating at the edge of the member.

The rotatable member illustrated in FIG. 6 may also be embodied in a brake of the multi-plate liquid-cooled type in a position which is separate from, and spaced from the braking member, or stack. In such a construction, the member acts as a turbo disc or pump member.

Figure 7:
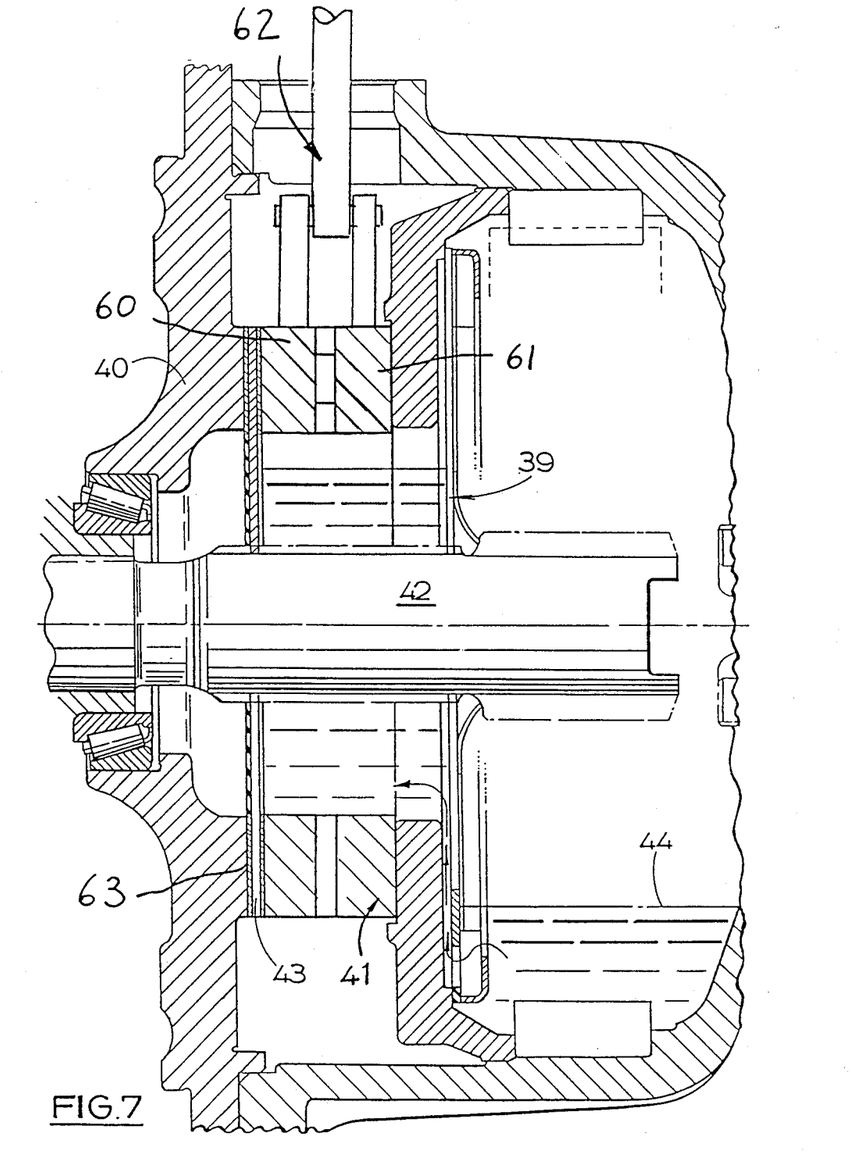
FIG. 7 is a section through a brake of the multi-plate type embodying the disc of FIG. 6 as a pump member.

As illustrated in FIG. 7 the member 39 is spaced axially in a housing 40 from the brake stack 41 and is slidably mounted on a shaft or axle 42 adapted to be braked.

The stack 41 includes a pair of pressure plates 60, 61 of known construction which are relatively movable angularly by operation of an acutator mechanism 62 to cause the plates to spread and urge the braking members 43 against a relatively stationary surface 63 on the housing 40.

The diameter of the member 39 is greater than that of the braking members of the stack of which one is illustrated at 43. This increases the peripheral speed in comparison with that of the braking members, enabling a larger volume of liquid to be pumped from a much lower liquid or oil level in a sump as shown at 44.

Figure 8:
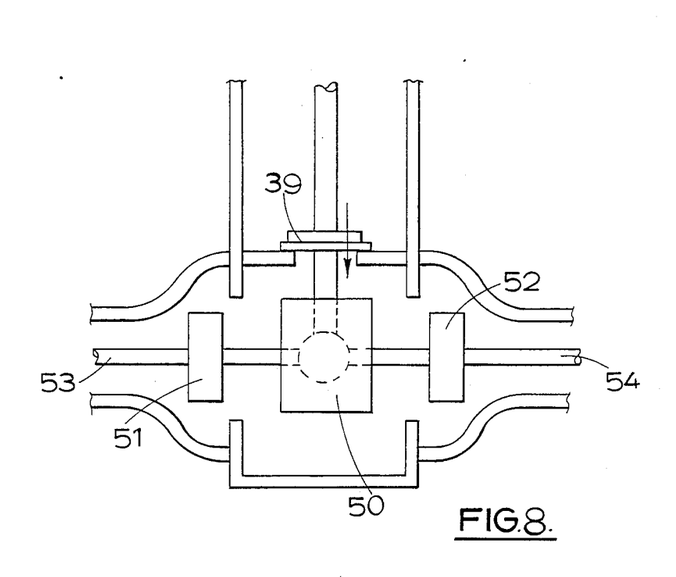
FIG. 8 shows the incorporation of the disc of FIG. 6 at the entrance to a differential.

The turbo-disc 39 may be installed as shown in FIG. 8 at the entrance to an axle differential 50 to pump liquid to each of two liquid-cooled brakes 51, 52, each adapted to brake one respective axle or half shaft 53, 54.

Figure 9:
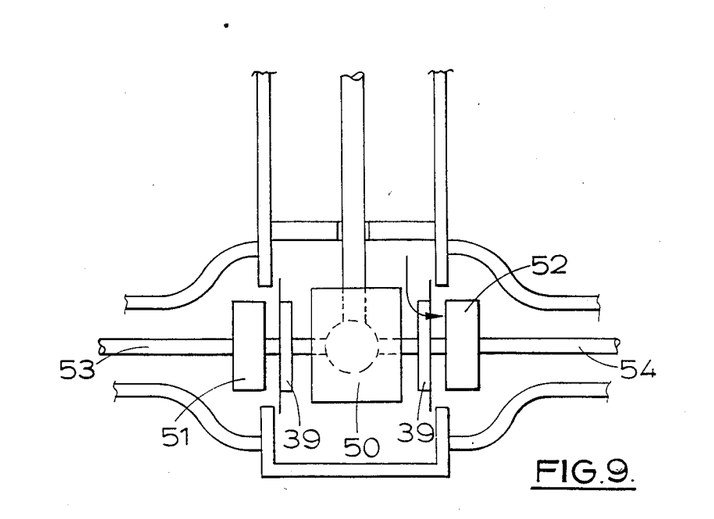
FIG. 9 shows the incorporation of spaced discs in an axle.

In another construction shown in FIG. 9, a turbo disc is associated with each brake 51,52.

We claim:

1. A rotatable braking member for a brake of the liquid-cooled type comprising a rotatable disc having an annular braking surface adapted for engagement with a relatively stationary braking surface of a brake in which said member is to be fitted, said annular braking surface having an inner peripheral edge and an outer peripheral edge, and the disc incorporates a plurality of angularly spaced liquid supply grooves in the form of slots which extend completely through the material of the disc, each said slot having a redial arm portion and a circumferential arm portion extending substantially perpendicularly to said radial arm portion, said radial arm portions extending radially outwards from respective circumferential arm portions of said slots which are disposed at a position inward of said inner peripheral edge of said annular braking surface, and wherein said circumferential arm portion of each said slot is of a circumferential length greater than any portion of the circumferential width of said associated radial arm portion.

2. A member as claimed in claim 1, wherein each said slot is substantially of L-shaped outline having a foot, and said foot constitutes said circumferential arm portion.

3. A member as claimed in claim 2, wherein said braking member is also combined in an assembly with a plurality of angularly spaced baffles which extend axially from at least one face of the braking member, and said baffles overlie said circumferential arm portions of the slots but terminate short of said inner peripheral edge of said braking surface.

4. A member as claimed in claim 3, wherein said baffles correspond in number to the number of slots provided in said member.

5. A member as claimed in claim 1, wherein each said slot is substantially of Tee outline having a head, said head of said Tee constituting said circumferential arm portion.

6. A rotatable braking member as claimed in claim 1, wherein said annular braking surface is defined on one planar face of said member and a reservoir for cooling liquid is secured to the other, opposite, planar face of said braking member at a position radially inside said inner peripheral edge, and said circumferential arm portion of said slot is disposed at least partially within the area of said reservoir whereby to provide a fluid pathway from said reservoir secured to said other planar face of said braking member to said radial arm portion of said slot and thereby to said braking surface provided on said one planar face of said braking member.

7. A self-energising disc brake of the liquid-cooled type comprising a housing containing cooling liquid and defining a sump, at least one rotatable friction braking member disposed within said housing and slidably keyed to a shaft to be braked, annular braking surfaces on opposite sides of said braking member, relatively stationary braking surfaces in said housing, and actuating means for urging said annular braking surfaces and said relatively stationary braking surfaces into engagement to apply said brake, wherein each said annular braking surface has an inner peripheral edge and an outer peripheral edge, and said braking member incorporates a plurality of angularly spaced liquid supply grooves in the form of slots which extend completely through the material of the braking member and radially outwards from a position inwardly of said inner peripheral edges of said braking surfaces, each said slot having a radial arm portion and a circumferential arm portion extending substantially perpendicularly to said radial arm portion, said radial arm portions extending radially outwards from respective circumferential arm portions of said slots which are disposed at a position inward of said inner peripheral edge of said braking surface, and wherein said circumferential arm portion of each said slot is of a circumferential length greater than any portion of the circumferntial width of said associated radial arm portion.

8. A disc brake as claimed in claim 7, wherein each said slot is substantially L-shaped outline having a foot and said foot constitutes said circumferential arm portion.

9. A disc brake as claimed in claim 8, wherein said braking member is also combined in an assembly with a plurality of angularly spaced baffles which extend axially from at least one face of said braking member, said baffles overlying said circumferential arm portions of said slots but terminating short of said inner peripheral edges of said respective braking surfaces.

10. A disc brake as claimed in claim 9, wherein said baffles correspond in number to the number of said slots provided in said member.

11. A disc brake as claimed in claim 9, wherein said baffles are disposed adjacent to trailing edges of said slots for a normal forward direction of rotation of the member in order to improve the direction of cooling liquid into said slots.

12. A disc brake as claimed in claim 11, wherein said feet of said slots extend circumferentially relatively away from said baffles.

13. A disc brake as claimed in claim 9, wherein said baffles are arranged within a reservoir for cooling liquid which is defined between said braking member and an annular wall and to which liquid is adapted to be supplied form said sump.

14. A disc brake as claimed in claim 7, wherein each said slot is substantially of Tee outline having a head, said head said constituting said circumferential arm portion.

15. A brake of the liquid cooled type comprising a housing containing cooling liquid and defining a sump, braking means disposed within said housing, and a rotatable pump member for circulating said cooling liquid through said braking means, wherein said pump member comprises a rotatable disc defining an annular pumping surface having an inner peripheral edge and an outer peripheral edge, and said disc incorporataes a plurality of angularly spaced liquid supply grooves in the form of slots which extend completely through the material of the disc and radially outwards from a position inwardly of the inner peripheral edge, each said slot having a radial arm portion and a circumferential arm portion extending substantially perpendicularly to said radial arm portion, said radial arm portions extending radially outwards from respective circumferential arm portions of said slots which are disposed at a position inward of said inner peripheral edge of said pumping surface, and wherein said circumferential arm portion of each said slot is of a circumferential length greater than any portion of the circumferential width of said radial arm portion of said associated radial arm portion.

16. A brake as claimed in claim 15, wherein said disc is also provided with an arrangement of liquid-flow grooves constructed and arranged according to the amount of liquid to be carried.

17. A brake as claimed in claim 15 wherein said disc has wider artery grooves feeding smaller arterial capillary grooves, and/or smaller venal capillary grooves leading into larger vein grooves, said artery and arterial grooves providing a fluid pathway for cooling liquid to flow radially outward of said disc an said vein and venal grooves provinding a fluid pathway for return flow of said cooling liquid radially inward of said disc.

18. A brake as claimed in claim 17, wherein said artery and arterial grooves form a first set of interlinked grooves and said vein and venal grooves form a second set of interlinked grooves, said first and second set of grooves not being interconnected with each other on said disc but both extending to and opening at said outer peripheral edge thereby allowing fluid communication between said first and second sets of grooves.

19. A brake as claimed in claim 15, wherein said disc comprises an annular metal core provided on opposite sides with annular linings one of which defines said pumping surface, and said slots extend through the material of said core and through said linings, said liquid flow grooves being providid only in said linings.

* * * * *